US008435112B2

(12) United States Patent
Fujimoto et al.

(10) Patent No.: US 8,435,112 B2
(45) Date of Patent: May 7, 2013

(54) GAMING MACHINE FOR PROVIDING AN AWARD FOR INSURANCE AND CONTROLLING METHOD THEREOF

(75) Inventors: Jun Fujimoto, Tokyo (JP); Yukinori Inamura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1305 days.

(21) Appl. No.: 12/024,571

(22) Filed: Feb. 1, 2008

(65) Prior Publication Data

US 2008/0254875 A1 Oct. 16, 2008

Related U.S. Application Data

(60) Provisional application No. 60/907,682, filed on Apr. 13, 2007.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .............................................. 463/27; 463/25

(58) Field of Classification Search .................... 463/25, 463/27
See application file for complete search history.

(56) References Cited

U.S. PATENT DOCUMENTS

| | | | | |
|---|---|---|---|---|
| 4,283,709 | A | 8/1981 | Lucero et al. | |
| 4,624,459 | A | 11/1986 | Kaufman | |
| 4,669,731 | A | 6/1987 | Clarke | |
| 4,837,728 | A | 6/1989 | Barrie et al. | |
| 4,964,638 | A | 10/1990 | Ishida | |
| 5,178,390 | A * | 1/1993 | Okada | 273/143 R |
| 5,280,909 | A | 1/1994 | Tracy | |
| 5,564,700 | A | 10/1996 | Celona | |
| 5,611,730 | A | 3/1997 | Weiss | |
| 5,639,088 | A | 6/1997 | Schneider et al. | |
| 5,695,402 | A | 12/1997 | Stupak | |
| 5,702,303 | A | 12/1997 | Takemoto et al. | |

(Continued)

FOREIGN PATENT DOCUMENTS

| | | |
|---|---|---|
| CN | 1831881 | 9/2006 |
| DE | 3242890 | 5/1984 |

(Continued)

OTHER PUBLICATIONS

Macao Official Action and Search Report, dated Oct. 15, 2009; English translation included.

*Primary Examiner* — Michael Cuff
*Assistant Examiner* — Kevin Y Kim
(74) *Attorney, Agent, or Firm* — Lexyoume IP Meister, PLLC.

(57) ABSTRACT

In a gaming machine, when a slot game displayed on a screen of a lower liquid crystal display is executed with a maximum wager betted thereon by a player, the controller has the slot game counted by a counter for counting rescue-setting games. When the count value, by the counter, for rescue-setting games reaches a thousand games and no payout of sixty times or higher ever occurs by that time, the controller provides, as a rescue pay, a payout having been increased by increments each of which is equivalent to a part of a wager betted on each of the slot games that have been executed thus far. The controller provides the payout of the rescue pay by paying out medals to the medal tray.

16 Claims, 14 Drawing Sheets

U.S. PATENT DOCUMENTS

| | | | |
|---|---|---|---|
| 5,770,533 | A | 6/1998 | Franchi |
| 5,820,459 | A | 10/1998 | Acres et al. |
| 5,836,817 | A | 11/1998 | Acres et al. |
| 5,890,963 | A | 4/1999 | Yen |
| 5,910,048 | A | 6/1999 | Feinberg |
| 6,001,016 | A | 12/1999 | Walker et al. |
| 6,003,013 | A | 12/1999 | Boushy et al. |
| 6,089,980 | A | 7/2000 | Gauselmann |
| 6,224,482 | B1 | 5/2001 | Bennett |
| 6,234,896 | B1 | 5/2001 | Walker et al. |
| 6,244,957 | B1 | 6/2001 | Walker et al. |
| 6,254,483 | B1 | 7/2001 | Acres |
| 6,257,981 | B1 | 7/2001 | Acres et al. |
| 6,270,409 | B1 | 8/2001 | Shuster |
| 6,273,820 | B1 | 8/2001 | Haste, III |
| 6,695,697 | B1 | 2/2004 | Okada |
| 6,932,704 | B2 | 8/2005 | Walker et al. |
| 6,932,707 | B2 | 8/2005 | Duhamel |
| 2003/0069073 | A1 | 4/2003 | Okada |
| 2006/0211485 | A1 | 9/2006 | Fujimoto |
| 2007/0060254 | A1 * | 3/2007 | Muir ............................... 463/16 |

FOREIGN PATENT DOCUMENTS

| | | | |
|---|---|---|---|
| DE | 3712841 | | 11/1988 |
| DE | 4137010 | | 8/1992 |
| DE | 10049444 | | 11/2001 |
| EP | 0497562 | | 8/1992 |
| EP | 0 631 798 | A1 | 1/1995 |
| EP | 0 840 264 | A1 | 5/1998 |
| EP | 1 192 975 | A1 | 4/2002 |
| EP | 1 302 914 | A2 | 4/2003 |
| EP | 1 351 180 | A2 | 10/2003 |
| EP | 1 477 947 | A2 | 11/2004 |
| EP | 1 544 811 | A2 | 6/2005 |
| GB | 2 326 830 | A | 1/1999 |
| WO | WO03/083795 | A1 | 10/2003 |
| WO | WO2004/095383 | A | 11/2004 |
| WO | 2005086778 | | 9/2005 |

* cited by examiner

PAYOUT TABLE

| ALL PAYS ON PAYLINE | 1ST Credit | 2ND Credit | 3RD Credit |
|---|---|---|---|
|  DOUBLE DOUBLE DOUBLE | 800 | 1600 | 2400 |
| BAR BAR BAR<br>BAR BAR BAR<br>BAR BAR BAR | 60 | 120 | 180 |
| BAR BAR BAR<br>BAR BAR BAR | 30 | 60 | 90 |
|  | 20 | 40 | 60 |
| BAR BAR BAR | 15 | 30 | 45 |
| ANY ANY ANY<br>BAR BAR BAR | 5 | 10 | 15 |
| ANY 2  | 5 | 10 | 15 |
| ANY 1  | 2 | 4 | 6 |

GAMING MACHINE FOR PROVIDING AN AWARD FOR INSURANCE AND CONTROLLING METHOD THEREOF

CROSS REFERENCE TO RELATED APPLICATIONS

This application claims priority to U.S. provisional patent application Ser. No. 60/907,682 filed on Apr. 13, 2007, and which is incorporated by reference herein for all purposes.

BACKGROUND OF THE INVENTION

1. Field of the Invention

The present invention relates to a gaming machine for providing an award payout for insurance with execution of a game and to a playing method thereof.

2. Description of the Related Art

In a facility with gaming machines, such as slot machines, set up therein, a player bets a wager of coins, credits or the like in a gaming machine to play a game that the gaming machine offers. Such gaming machines are disclosed in: U.S. Pat. No. 5,820,459, U.S. Pat. No. 6,695,697, US Patent Application Publication No. 2003/0069073, EP Patent Application Publication No. 1192975, U.S. Pat. Nos. 6,254,483, 5,611,730, 5,639,088, 6,257,981, 6,234,896, 6,001,016, 6,273,820, 6,224,482, 4,669,731, 6,244,957, 5,910,048, 5,695,402, 6,003,013, 4,283,709, EP Patent Application Publication No. 0631798, German Patent Application Publication No. 4137010, UK Patent Application Publication No. 2326830, German Patent Application Publication No. 3712841, U.S. Pat. Nos. 4,964,638, 6,089,980, 5,280,909, 5,702,303, 6,270,409, 5,770,533, 5,836,817, 6,932,704, 6,932,707, 4,837,728, EP Patent Application Publication No. 1302914, U.S. Pat. Nos. 4,624,459, 5,564,700, WO Patent Publication No. 03/083795, German Patent Application Publication No. 324289, EP Patent Application Publication No. 0840264, German Patent Application Publication No. 10049444, WO Patent Publication No. 04/095383, EP Patent Application Publication No. 1544811, U.S. Pat. No. 5,890,963, EP Patent Application Publication No. 1477947, EP Patent Application Publication No. 1351180.

A slot machine, for example, executes a slot game. When playing a slot game, a player bets a wager in a slot machine. Every time the player presses a switch, a plurality of symbols arranged on a display are rearranged. When the combination of the plurality of symbols rearranged on the display is a predetermined winning combination, the slot machine provides a payout to the player corresponding to the winning combination.

In addition, a payout called Jackpot is also carried out in the slot machine. The slot machine accumulates a part of wager that the player bets on the slot machine to a Jackpot-payout pool, and determines whether or not the payout of Jackpot is carried out at a predetermined timing. When the slot machine determines the carrying-out of the Jackpot, the slot machine pays out a part of, or the whole of, the accumulated wagers to the player.

SUMMARY OF THE INVENTION

An object of the present invention is to provide a more entertaining gaming machine and a method of playing the gaming machine.

A first aspect of the present invention provides a gaming machine comprising: a bet switch capable of betting in a plurality of patterns with different amount of wagers; a display adapted to display a game operable upon a wager made by a player; a first counter in which a count value of the first counter is incremented by an execution of the game on which a player bets a maximum wager and the count value of the first counter is reset when a first reset condition is established; a second counter in which a count value of the second counter is incremented by an occurrence of an event related to any one of a betting of a wager and an award in the game and the count value of the second counter is reset when a second reset condition is established; and a controller configured to: (a) provide an award for insurance in accordance with the count value of the second counter when the count value of the first counter reaches a predetermined value; (b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

A second aspect of the present invention provides a gaming machine comprising: a bet switch capable of betting in a plurality of patterns with different amount of wagers; a display adapted to display a game operable upon a wager made by a player; a first counter in which a count value of the first counter is incremented by an execution of the game on which a player bets a maximum wager and the count value of the first counter is reset when a first reset condition is established; a second counter in which a count value of the second counter is incremented, for every execution of the game, by an amount equivalent to a part of the maximum wager betted on the executed game and the count value of the second counter is reset when a second reset condition is established; and a controller configured to: (a) provide an award for insurance in accordance with the count value of the second counter when the count value of the first counter reaches a predetermined value; (b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

A third aspect of the present invention provides a gaming machine comprising: a bet switch capable of betting in a plurality of patterns with different amount of wagers; a display adapted to display a game operable upon a wager made by a player; a first counter in which a count value of the first counter is incremented by an execution of the game on which a player bets a maximum wager and the count value of the first counter is reset when a first reset condition is established; a second counter in which a count value of the second counter is incremented, for every execution of the game on which the player bets the maximum wager, by an amount equivalent to a part of the maximum wager betted on the executed game and the count value of the second counter is reset when a second reset condition is established; and a controller configured to: (a) provide an award for insurance in accordance with the count value of the second counter when the count value of the first counter reaches a predetermined value; (b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

A fourth aspect of the present invention provides a gaming machine comprising: a bet switch capable of betting in a plurality of patterns with different amount of wagers; a display adapted to display a game operable upon a wager made by a player; a first counter in which a count value of the first counter is incremented by an execution of the game on which a player bets a maximum wager and the count value of the first counter is reset when a first reset condition is established; a second counter in which a count value of the second counter is incremented, for every occurrence of an award corresponding to an outcome of the game, by an amount equivalent to a part of the occurred award and the count value of the second counter is reset when a second reset condition is established; and a controller configured to: (a) provide an award for insurance in accordance with the count value of the second counter when the count value of the first counter reaches a predetermined value; (b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

A fifth aspect of the present invention provides a method of playing a gaming machine, the method comprising the steps of: accepting a betting of a wager made by a player; executing a game in response to the betting of the wager made by the player; incrementing a count value of a first counter with the execution of the game on which the player bets a maximum wager; incrementing a count value of a second counter with an occurrence of an event related to any one of a betting of a wager and an award in the game; providing an award for insurance in accordance with the count value of the second counter when the count value of the first counter reaches a predetermined value; resetting the count value of the first counter when the award for insurance is provided; and resetting the count value of the second counter when the award for insurance is provided.

A sixth aspect of the present invention provides a method of playing a gaming machine, the method comprising the steps of: accepting a betting of a wager made by a player; executing a game in response to the betting of the wager made by the player; incrementing a count value of a first counter with the execution of the game on which the player bets a maximum wager; incrementing a count value of a second counter, for every execution of the game, by an amount equivalent to a part of the maximum wager betted on the executed game; providing an award for insurance in accordance with the count value of the second counter when the count value of the first counter reaches a predetermined value; resetting the count value of the first counter when the award for insurance is provided; and resetting the count value of the second counter when the award for insurance is provided.

A seventh aspect of the present invention provides a method of playing a gaming machine, the method comprising the steps of: accepting a betting of a wager made by a player; executing a game in response to the betting of the wager made by the player; incrementing a count value of a first counter with the execution of the game on which the player bets a maximum wager; incrementing a count value of a second counter, for every execution of the game on which the player bets the maximum wager, by an amount equivalent to a part of the maximum wager; providing an award for insurance in accordance with the count value of the second counter when the count value of the first counter reaches a predetermined value; resetting the count value of the first counter when the award for insurance is provided; and resetting the count value of the second counter when the award for insurance is provided.

An eighth aspect of the present invention provides a method of playing a gaming machine, the method comprising the steps of: accepting a betting of a wager made by a player; executing a game in response to the betting of the wager made by the player; incrementing a count value of a first counter with the execution of the game on which the player bets a maximum wager; incrementing a count value of a second counter, for every occurrence of an award corresponding to an outcome of the game, by an amount equivalent to a part of the occurred award; providing an award for insurance in accordance with the count value of the second counter when the count value of the first counter reaches a predetermined value; resetting the count value of the first counter when the award for insurance is provided; and resetting the count value of the second counter when the award for insurance is provided.

DETAILED DESCRIPTION OF THE EMBODIMENT

Figure 1:
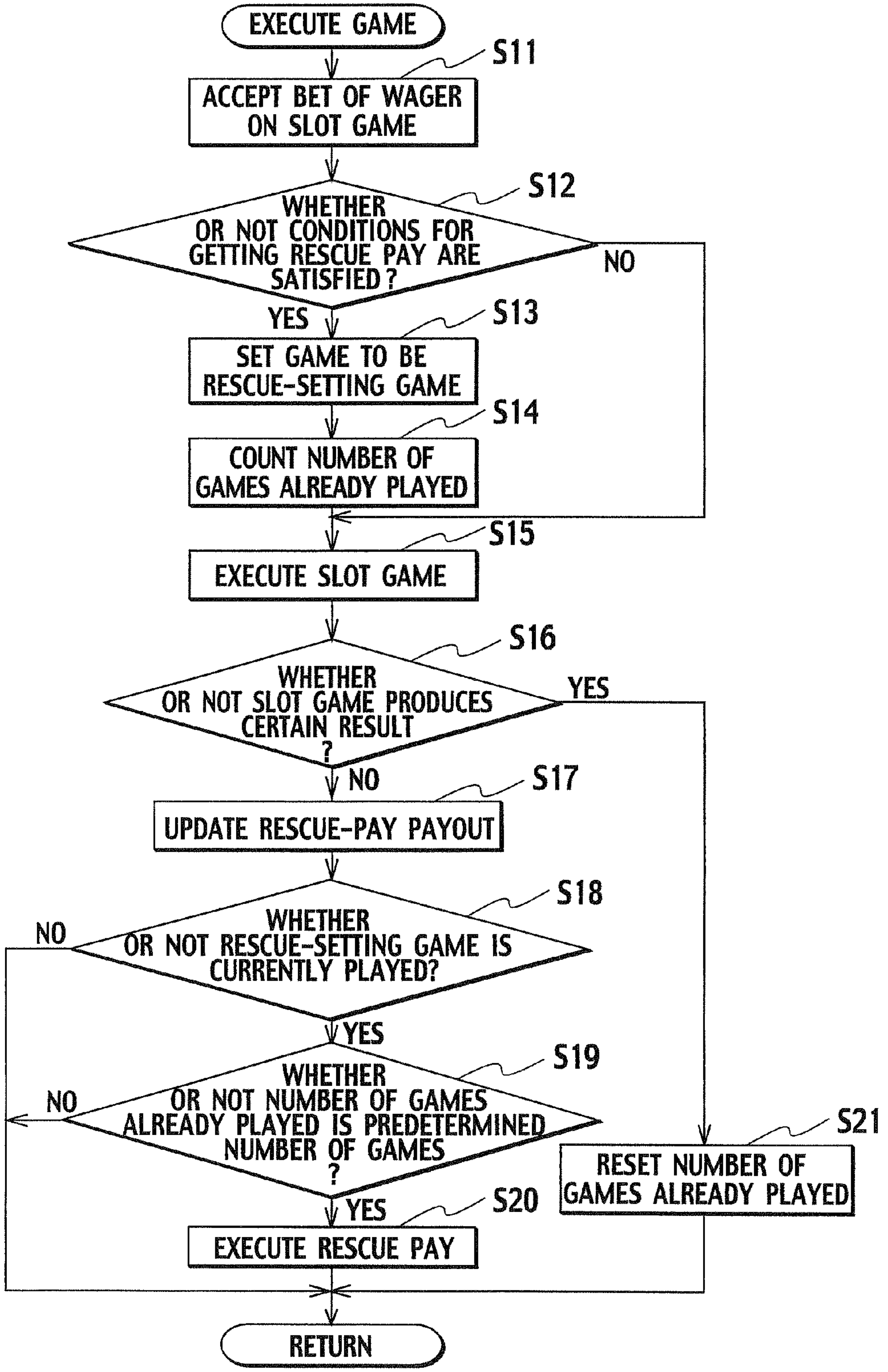
FIG. 1 is a flowchart showing an outline of a procedure for processing in a slot machine according to an embodiment of the present invention.
Figure 2:
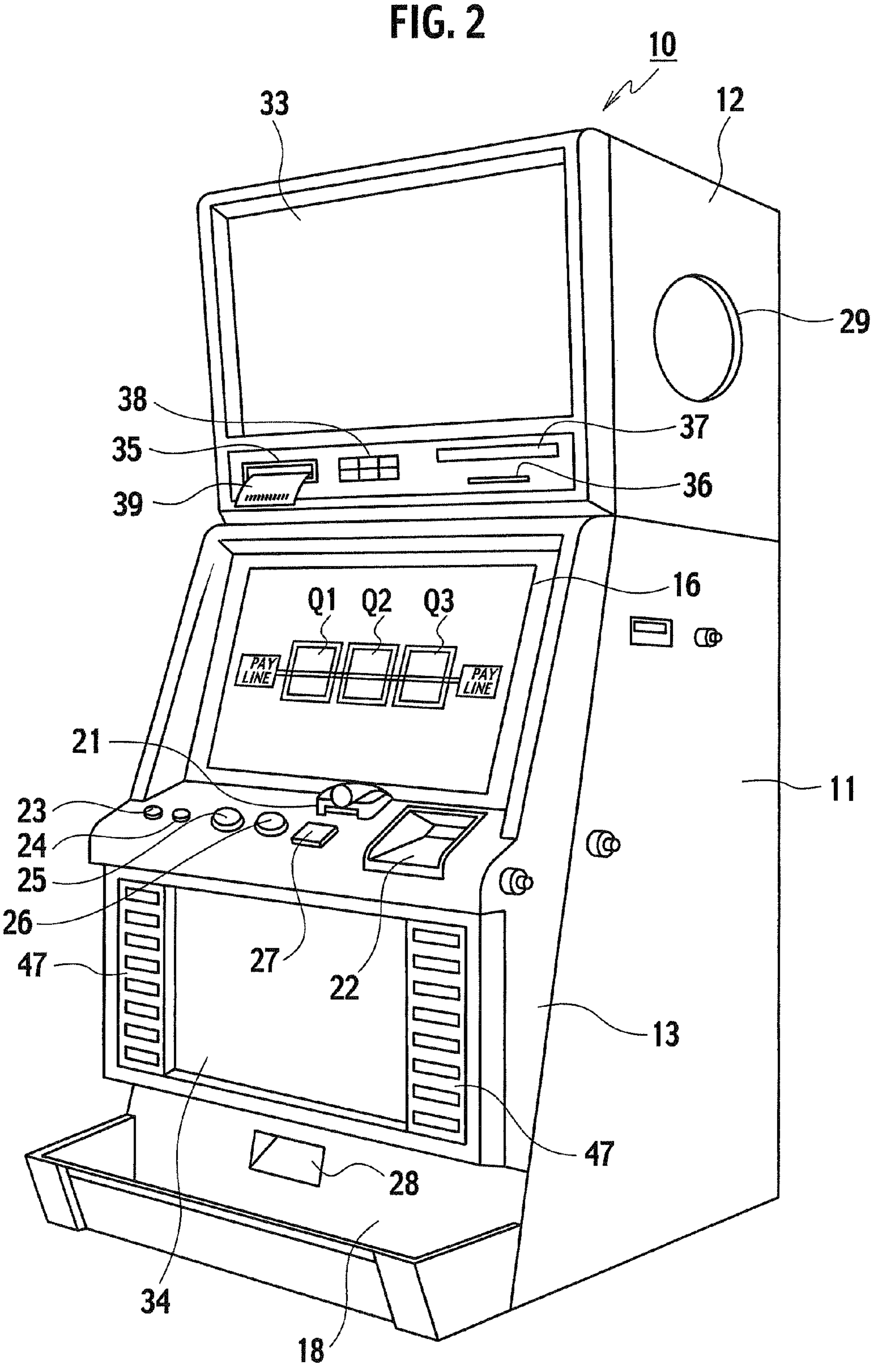
FIG. 2 is a perspective view of the slot machine according to the embodiment of the present invention.

What follows is an outline of the operation of a slot machine, which is an example of a gaming machine according to the present invention with reference to a flowchart shown in FIG. 1 and a perspective view of a slot machine 10 shown in FIG. 2. An outline of a method of playing the slot machine is also provided below.

With the slot machine 10 according to this embodiment and by a method of playing the slot machine 10, a player can play a slot game (a game) once by betting a wager. Specifically, the player can make a bet of wager by throwing a medal, which is a cashable credit, or a coin into the slot machine 10. Another method of making a betting of a wager is to use restricted credits. The restricted credits are computerized credits, and are stored in the slot machine 10. The player can continue to use the restricted credits as wagers until they get cashed. The player can allocate restricted credits as many as he/she specifies for wagers, by operating the slot machine 10.

In the description that follows, a unit of wager that the player can bet with cashable and restricted credits is called "credit." For example, when the player throws a wager of a single medal, or a single coin, into the slot machine 10, the player bets a wager of "one credit." Alternatively, when the player operates the slot machine 10 to allocate two restricted credits for wagers, the player bets a wager of "two credits."

With the slot machine 10 according to this embodiment and by a method of playing the slot machine 10, a condition is set under which the player can get an insurance pay, a payout (an award) as an insurance. A description of the insurance pay will be given later. (The "insurance pay" is hereinafter called a "rescue pay." Both "insurance pay" and "rescue pay" are currently applied for trademark registration.) Establishment of such a condition causes a rescue pay to be executed. The payout of the rescue pay, as described later, is updated and accrues as needed along with the occurrence of an event related to a bet of a wager made by a player on a slot game, or of an event related to a payout in the slot game.

As described later, the "rescue pay" is a payout as an insurance to be paid out in the following case. A slot game in which the player makes a wager of MAXBET, and no payout is generated in response to the outcome of the game or the payout in response to the outcome of the corresponding slot game is less than a predetermined amount (for example, a payout of 60 or more credits for a bet of 1 credit), is played as many times as a maximum number of games (for example, a thousand games).

The slot machine 10 according to the embodiment, to begin with, accepts a betting of a wager made by a player on a single game to be executed next (step S11).

Subsequently, the slot machine 10 checks whether the accepted betting of a wager is MAXBET, which is the condition for player's getting a rescue pay (step S12). Here, MAXBET is a bet of a three-credit wager on a single slot game. Accordingly, a wager of three credits is a maximum wager in the embodiment.

Here, when the accepted wager is MAXBET, the bet is identified to be made not only on the slot game but also actually for a rescue pay. When, on the other hand, the accepted wager is not MAXBET, the bet is identified to be made only on the slot game without accompanying any actual wager for rescue pay.

When the accepted betting of a wager is MAXBET, (YES at step S12), the slot machine 10 sets the next slot game that is to be executed to be a rescue setting game (step S13), and then counts the number of rescue setting games that have been already played (step S14). When, on the other hand, the accepted betting of a wager is not MAXBET, (NO at step S12), the slot machine 10 does not set the next slot game that is to be executed to be a rescue setting game, nor does count the number of rescue setting games that have been already played. Accordingly, when the player makes a MAXBET, reaching the above-mentioned maximum number during the slot game causes the rescue pay to be executed.

Subsequently, the slot machine 10 executes the slot game (step S15). In the slot game, when the player presses a start button 27, the symbols start to scroll in each of three display areas Q1 to Q3, and eventually stop. The symbols displayed in the display areas Q1 to Q3 when the scrolling stops, in other words, the outcome of the slot game, form a winning combination, a payout is provided in accordance with the winning combination.

Figure 10:
FIG. 10 is a payout table showing relations between winning combinations in a slot game and payouts according to the embodiment of the invention.
Figure 10:
Figure 10:
Figure 10:

Thereafter, the slot machine 10 determines whether or not the outcome of the slot game is a particular outcome (step S16). The "particular outcome" here is, for example, a case where the game with a bet of a one-credit wager results in a payout of 60 or more credits. Specifically, it is a case where, as FIG. 10 shows, either "DOUBLE" symbols (particular symbol) or "Triple BAR" symbols (particular symbol) are displayed in all of the three display areas Q1 to Q3.

When the slot game results in the particular outcome (YES at step S16), the slot machine 10 resets the number of rescue setting games that have been already played, which number is counted in the processing at step S15 (step S21).

When, on the other hand, the slot game does not result in the particular outcome (NO at step S16), the slot machine 10 updates the payout for the rescue pay (step S17). The content of this update is determined by the occurrence of an event related to a bet of a wager made by a player on a slot game, and by the occurrence of an event related to the payout in a slot game. Specifically, the slot machine 10 increases the payout for a rescue pay by an amount equivalent to a part of the wager betted on a slot game, or by an amount equivalent to a part of the wager in a case where a wager of MAXBET is betted on a slot game. Alternatively, when a payout is generated in a slot game, a part of the payout may be allocated for the increase of the payout for the rescue pay. The updating of the payout for the rescue pay can be executed by an increment of the count value for counting the payout for the rescue pay.

Subsequently, the slot machine 10 determines whether or not the current game is a rescue-setting game (step S18). When the current game is a rescue-setting game, the slot machine 10 determines whether or not the number of the rescue-setting games having already been played has reached a maximum number of games (a predetermined number) (step S19). In this occasion, when the number of the rescue-setting games having already been played has reached the maximum number of games, a payout equivalent to the count value of the counter for counting the payout for the rescue pay is provided as a rescue pay (step S20).

The rescue setting game is thus set up. When the number of rescue setting games already played reaches to the maximum number during the rescue setting game, the rescue pay is executed.

With the slot machine 10 according to this embodiment and by a method of playing the slot machine 10, the slot machine 10 increments the value of the counter for counting a number of the slot games on which the player bets wagers for rescue pay, that is, the rescue setting games, that have been already played. The incrementing of the count value is done every time a slot game with a wager of MAXBET betted by the player is executed during the repeated execution of slot games with wagers betted by the player.

Here, in the slot machine 10, if a number of payouts do not occur over a number of consecutive slot games (for example, a thousand slot games) with wagers of MAXBET, the count value of the counter for the rescue setting games already played reaches a predetermined value (for example, a thousand counts).

When an event related to a betting of a wager made by a player or to a payout for a slot game occurs in the slot machine 10, the slot machine 10 increments the count value of the counter for counting the payout for the rescue pay. Specifically, every time the slot machine 10 executes a slot game, the slot machine 10 may increase the payout for the rescue pay by an amount equivalent to a part of the wager betted on the slot game. Alternatively, every time the slot machine 10 executes a slot game on which the player makes a betting of a wager of MAXBET, the slot machine 10 may increase the payout for the rescue pay by an amount equivalent to a part of the wager of MAXBET betted on the slot game. Still alternatively, every time a payout is generated in a slot game, the slot machine 10 may increase the payout for the rescue pay by an amount equivalent to a part of the payout that is won.

With the slot machine 10 and in the method of playing the slot machine 10 in this embodiment, when the count value of the counter for counting the number of rescue-setting games having already been played reaches a predetermined number of games, the slot machine 10 provides a payout equivalent to the count value of the counter for counting the payout for the rescue pay as a rescue pay. In addition, the slot machine 10 resets the count value of the counter for counting the number of the rescue-setting games that have already been played.

According to the slot machine 10 and the method of playing the slot machine 10 of this embodiment, when the execution of a considerable number of slot games (for example, 1000 games) on each of which the player makes a betting of a wager of MAXBET are finished, the player receives the rescue pay, which is a payout different from the payout for the slot game.

In addition, according to the slot machine 10 and the method of playing the slot machine 10 of this embodiment, the payout for the rescue pay is incremented with the occurrence of an event related to the betting of a wager made on a slot game, and to a payout for the slot game. The betting and the payout related to such an event includes wagers that the player bets on the slot games having already been executed, the wager of MAXBET that the player makes, and the payout for the slot games. Thus, the payout for rescue pay is increased progressively.

With the slot machine 10 according to this embodiment and by a method of playing the slot machine 10, the betting of a MAXBET wager on a slot game entails, by definition, an actual betting of wager to be the conditions for getting the rescue pay, that is, the betting for turning the rescue ON.

What follows next is a detailed description of the configuration of the slot machine 10 according to the embodiment. As FIG. 2 shows, the slot machine 10 according to the embodiment includes a cabinet 11, a top box 12 provided on top of the cabinet 11, and a main door 13. A lower liquid crystal display 16 (display) is provided to the cabinet 11, precisely in a surface thereof facing the player. Various components provided inside the cabinet 11 include a controller 40 (see FIG. 3) for electrically controlling the slot machine 10. Also included is a hopper 44 (see FIG. 3) for controlling the throwing-in, the accumulation, and the paying-out, of the medals.

The betting of wager for playing the game is made using medals in the example of this embodiment, but the betting of wager can be made using, in addition to medals, coins, and cashable credits such as tokens. Moreover, what can also be used for betting wager are restricted credits. The restricted credits are computerized, like electronic money, or some electronic information with values, which is equivalent to the electronic money. The restricted credits are stored in the slot machine 10, and the player can continue to use the restricted credits as the wager until the restricted credits get cashed.

The main door 13, which can be opened and closed, is attached to the cabinet 11, and the lower LCD (liquid crystal display) 16 is installed approximately in the center portion of the main door 13. As described later, the lower LCD 16 displays images related to various games including slot games. In slot games, the symbols arranged in the three, horizontally-arranged display areas Q1 to Q3 are changed, and then are rearranged. When the combination of the symbols rearranged in the display areas Q1 to Q3 form a winning combination (see FIG. 10), a payout of a predetermined amount is provided in accordance with the content of the winning combination. In this embodiment, the payout corresponding to the winning combination (the outcome of a slot game) is carried out by, as described in detail later, increasing the number of restricted credits, which number is stored in the slot machine 10. The number of stored restricted credits is, as described in detail later, displayed on the screen of the LCD 16.

Provided below the lower LCD 16 are a medal insertion slot 21 into which medals are thrown, and a bill-validator 22, which determines the adequacy of bills, and which accepts only authentic bills. In addition, various operation buttons are provided in the vicinity of the medal insertion slot 21 and of the bill-validator 22.

Provided as the above-mentioned operation buttons are a cash-out button 23, a MAXBET button 24, a BET button 25, a spin-repeat-bet button 26, and a start button 27.

When the player makes a betting of a wager using restricted credits on a slot game executed in the lower LCD 16, the player uses the BET button 25 for determining the number of restricted credits to be betted as the wager. One credit is betted by every single press of the BET button 25.

The player operates the spin-repeat-bet button 26 when he/she bets on the current game a wager of the same number of credits as those betted, using the above-described BET button 25, on the previous game. With this spin-repeat-bet button 26, the player can make, on the current slot game, a betting of a wager of the same number of credits as those betted on the previous slot game. A single operation of the spin-repeat-bet button 26 replaces, and eliminates the trouble of, as many operations of the BET button 25 as the number of credits to be betted on the current slot game.

The player presses the start button 27 to start a slot game in the lower LCD 16 after the player makes a betting of a wager. After the wager is betted on the current slot game either by throwing medals into the medal insertion slot 21, or by determining the number of credits using the BET button, the player presses this start button 27 to start the slot game displayed in the display areas Q1 to Q3.

The cash-out button 23 is provided for paying out the number of restricted credits, which number is stored and displayed on the lower LCD 16. The restricted credits are paid out while being converted into medals. The paid-out medals are discharged through an opening formed in a lower portion of the front face of the main door 13, that is, through a medal-paying-out opening 28, and are accumulated in a medal tray 18.

By a single operation of the MAXBET button 24, the player bets the maximum wager (for example, of three credits) that the player can bet on a single slot game. The maximum wager that is allowed to be betted on a single slot game can be changed by an operation of an administrator.

A foot display 34 is installed in a lower portion of the front face of the main door 13, and displays various images related to slot games. Examples of these images include characters of the slot game executed in the slot machine 10.

Lamps 47 are provided on the left and right sides of the foot display, and emit light in pre-set light-emitting patterns. The above-described medal-paying-out opening 28 is provided below the foot display 34.

An upper LCD 33 is installed in the front face of the top box 12. This upper LCD 33 displays the numbers of paid-out medals for combinations of symbols and other effect images.

A speaker 29 is installed in the top box 12. A ticket printer 35, a card reader 36, a data display 37 and a key pad 38 are provided below the upper LCD 33. The ticket printer 35 prints bar-coded data on each of the number of credits, the date and time, the identification number of the slot machine 10 and the like on a ticket, and then outputs the bar-corded ticket 39.

The player can have the bar-coded ticket 39 read by another slot machine, and can play this slot machine. In addition, the player can bring the bar-coded ticket 39 to a predetermined place within the game facility (for example, a casher in the casino), and can exchange the ticket 39 for bills or the like.

The card reader 36 can read data from and write data in a smart card that is inserted into the card reader 36. The player carries the smart card with him/her, to store therein data on the identification of the player, data on the history of the games that the player has played.

Figure 3:
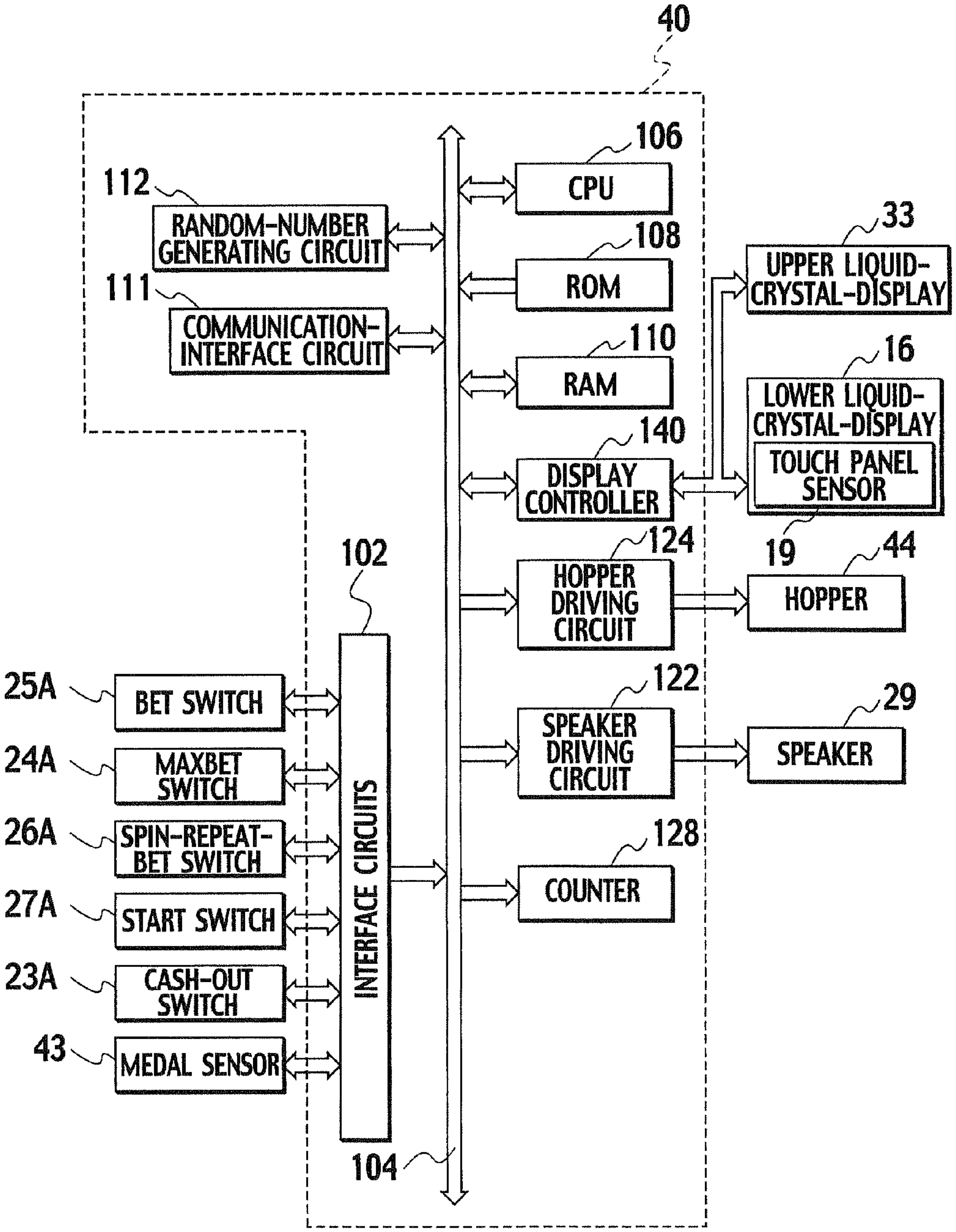
FIG. 3 is a block diagram showing a control circuit in the slot machine according to the embodiment of the present invention.

FIG. 3 is a block diagram showing an electric configuration of the controller 40 and various devices connected to the controller 40 provided to the slot machine 10 according to this embodiment. The controller 40, shown in FIG. 3, of the slot machine 10 is a microcomputer, and includes interface circuits 102, an input/output bus 104, a CPU 106, a ROM 108, a RAM 110, a communication-interface circuit 111, a random-number generating circuit 112, a speaker driving circuit 122, a hopper driving circuit 124, a counter 128 and a display controller 140.

The interface circuits 102 are connected to the input/output bus 104. Through the input/output bus 104, data signals and address signals are inputted into, or outputted from, the CPU 106.

A start switch 27A is connected to the interface circuits 102, and detects an operation on the start button 27. The start switch 27A outputs a starting signal. The starting signal is converted into a predetermined signal in the interface circuits 102, and then is transmitted to the CPU 106 through the input/output bus 104.

Moreover, connected to the interface circuits 102 are: a BET switch 25A, which detects an operation on the BET button 25; a MAXBET switch 24A, which detects an operation on the MAXBET button 24; a spin-repeat-bet switch 26A, which detects an operation on the spin-repeat-bet button 26; and a cash-out switch 23A, which detects an operation on the cash-out button 23. The switching signals outputted from these switches 23A to 26A are supplied to the interface circuits 102, and converted into predetermined signals in the interface circuits 102. The converted signals are then transmitted to the CPU 106 through the input/output bus 104.

Furthermore, a medal sensor 43 is connected to the interface circuits 102, and detects the medal that is thrown into the medal insertion slot 21. To this end, the medal sensor 43 is disposed in the medal insertion slot 21, precisely, in a portion thereof into which medals are thrown. The medal sensor 43 outputs a detection signal. The detection signal is then supplied to the interface circuits 102, and converted into a predetermined signal in the interface circuits 102. After that, the converted signal is transmitted to the CPU 106 through the input/output bus 104.

A ROM 108 for storing a system program and a RAM 110 for saving various data are connected to the input/output bus 104. Also connected to the input/output bus 104 are the random-number generating circuit 112, the communication-interface circuit 111, the display controller 140, the hopper driving circuit 124, the speaker driving circuit 122 and the counter 128.

When the player operates the start button 27, the CPU 106 receives a signal from the start switch 27A. With the reception of the signal, the starting operation for the game is accepted, and the accepting of the starting operation triggers the reading of a game-execution program by the CPU 106. Thus, the slot game is executed. Note that the game-execution program is a program for executing a slot game on the lower LCD 16 with help of the display controller 140.

Specifically, what is programmed in the game-execution program is the execution of a slot game. In the game, symbols in each of the display areas Q1 to Q3 (see FIG. 2) are scrolled, and then are stopped (symbols that have been arranged are rearranged). In a case where the symbols displayed when the scrolling stops are of a winning combination, a payout is generated.

The communication interface circuit 111 is connected to a hall server and the like. Through the interface circuit 111, data on history of plays executed by this slot machine 10 is transmitted to the hall server, and various data transmitted from the hall server is received.

The random-number generating circuit 112 generates random numbers for determining whether or not a winning combination occurs in a slot game executed on the lower LCD 16.

The function of the counter 128 is to count the resource of the payout for rescue pay. The function of the counter 128 is to count the number of executed slot games (the number of slot games already played) with MAXBET, that is, slot games on each of which the player bets a wager of three credits, the maximum wager that the player can bet on a single slot game. The counter 128 can be set in the RAM 110.

The speaker driving circuit 122 outputs audio data to the speaker 29. Specifically, the CPU 106 reads audio data stored in ROM 108, and transmits the audio data to the speaker driving circuit 122 through the input/output bus 104. Thus, the speaker 29 emits predetermined effect sound.

The hopper driving circuit 124 outputs a pay-out signal to the hopper 44 when a cash-out occurs. Specifically, when the player operates the cash-out button 23, the CPU 106 receives a cash-out signal from the cash-out switch 23A. The CPU 106, then, outputs a driving signal to the hopper driving circuit 124 through the input/output bus 104. With this driving signal, the hopper 44 pays out medals equivalent to the number of restricted credits remaining at the time. The number of remaining restricted credits is stored in a predetermined memory area of the RAM 110, and is displayed on the screen of the lower LCD 16.

The display controller 140 performs a display control for executing a slot game on the lower LCD 16. Specifically, the CPU 106 generates a signal giving instructions that images should be displayed in response to the state of, and to the outcome of, the slot game. The CPU 106 outputs the signal of the image-display instruction to the display controller 140 through the input/output bus 104. When the display controller 140 receives the signal of the image-display instructions outputted from the CPU 106, the display controller 140 generates a driving signal for driving, in accordance with the image-display instructions, the lower LCD 16, and outputs the generated driving signal to the lower LCD 16. With this driving signal, the lower LCD 16 displays various images, such as effect images and images for explaining the game.

Incidentally, a touch panel sensor 19 is provided on the screen surface of the lower LCD 16. When the player touches the touch panel sensor 19, data on the contact position on the screen of the lower LCD is detected, and is transmitted to the CPU 106.

The display controller 140 also performs control for displaying, on the screen of the upper LCD 33, various images, such as effect images and images for explaining the game.

Subsequently, with reference to flowcharts shown respectively in FIGS. 4 to 9, a description will be given of a procedure for processing at the time when a game is executed on the slot machine 10 as a gaming machine according to the embodiment of the present invention.

Figure 4:
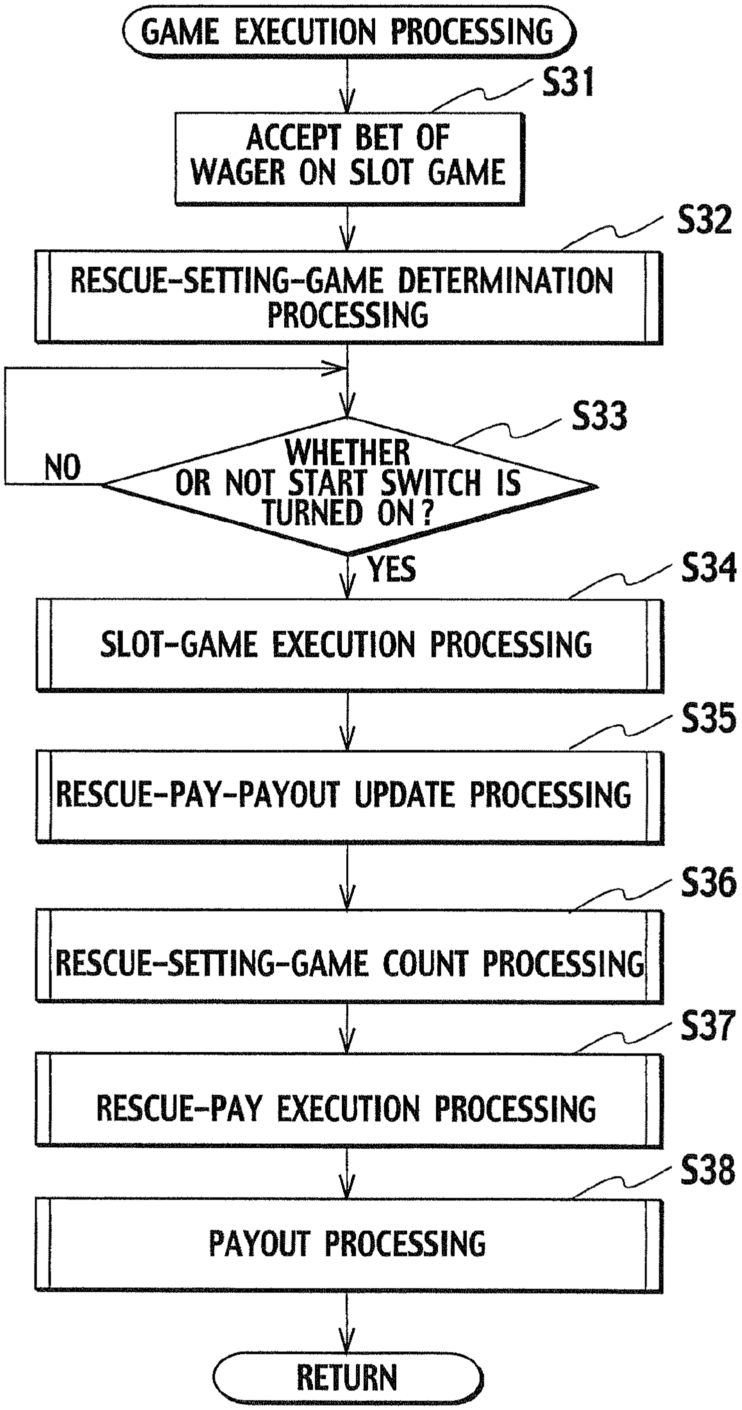
FIG. 4 is a flow chart showing a procedure for processing in the slot machine according to the embodiment of the present invention.

Firstly, the CPU 106 shown in FIG. 3 accepts a betting of a wager on a slot game that is about to be executed at step S31 in FIG. 4. Specifically, when a medal is thrown into the medal insertion slot 21, or when a betting of a wager is made with a restricted credit by the player's pressing the MAXBET button 24 or the BET button 25, the CPU 106 detects these operations.

As described above, the BET switch 25A detects the operation on the BET button 25, and the MAXBET switch 24A detects the operation on the MAXBET button 24. The medal sensor 43 is provided in the portion into which the medal is thrown of the medal insertion slot 21, and detects the medal thrown into the medal insertion slot 21. The BET switch 25A, the MAXBET switch 24A and the medal sensor 43, together, function as a switch for betting in a plurality of patterns with different wagers in this embodiment.

Subsequently at step S32, the CPU 106 executes a processing for determining whether or not the slot game that is to be executed next is a rescue-setting game, that is, a game involved in the rescue pay. The rescue-setting game determination is processed by referring to the content of the wager, the betting of which is accepted at step S31. A detailed description of the processing will be given later using a flowchart shown in FIG. 5.

Then, at step S33, the CPU 106 determines whether or not the start switch is turned ON by an operation by the player on the start button 27. When it is determined that the start switch is ON, the flow of control goes to the processing step S34.

At step S34, the CPU 106 performs the execution processing of the slot game. In this processing, the symbols arranged in the respective three display areas Q1 to Q3 are rearranged. A detailed description of the processing will be given later using a flowchart shown in FIG. 6.

At step S35, the CPU 106 executes the processing of updating the payout for the rescue pay. In this updating processing, every time a betting of a wager is accepted at step S31, the CPU 106 executes a processing of incrementing the count value of the counter 128 for counting the resource of the payout for rescue pay by an amount equivalent to a part of the wager (for example, one credit).

At step S36, the CPU 106 executes the processing of counting the rescue-setting games. In this counting processing, every time a rescue-setting slot-game is executed, the CPU 106 executes a processing of incrementing the count value of the counter 128 for counting the number of slot games with MAXBET having already been executed (the number of already-played games). A detail description for this step will be given later with reference to a flowchart of FIG. 7.

At step S37, the CPU 106 executes the processing of executing the rescue pay. In this executing processing, a rescue pay is generated when, over a predetermined number (for example 1000) of the consecutive slot games executed as rescue-GAMING MACHINE SYSTEM FOR PROVIDING A PAYOUT AS AN INSURANCE AND PLAYING METHOD THEREOF setting games, no slot game that generates a payout of a predetermined amount of credits (for example, a payout of 60 times and higher) occurs. A detail description for this step will be given later with reference to a flowchart of FIG. 8.

At step S38, the CPU 106 executes the processing of payout. In this processing, when the stop symbols for the respective three display areas Q1 to Q3 form a winning combination, or when a rescue pay occurs, the CPU 106 executes a payout with the medals or the restricted credits. Thereafter, the next game starts. A detailed description of the payout processing will be given later using a flowchart shown in FIG. 9.

Figure 5:
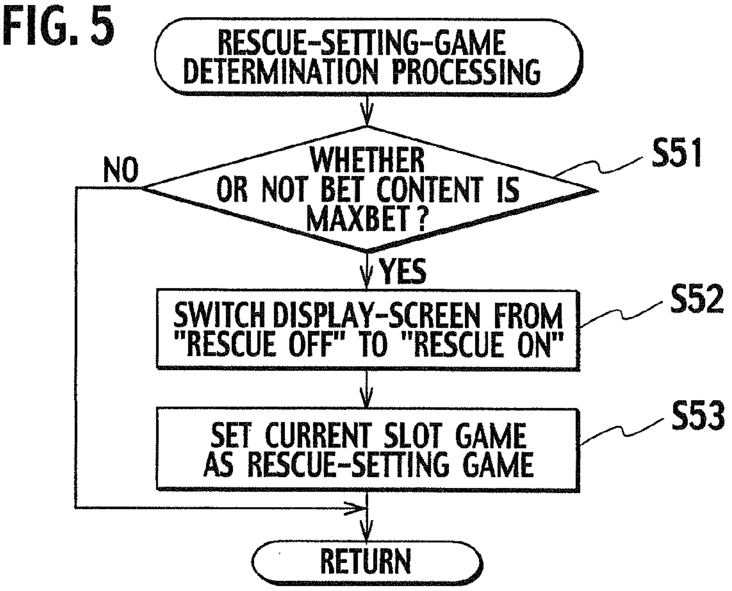
FIG. 5 is a flow chart showing a procedure for processing in the slot machine according to the embodiment of the present invention.

FIG. 5 is a flowchart showing a detailed procedure of the rescue-setting-game determination processing at step S32 in FIG. 4. Firstly, at step S51, the CPU 106 determines whether or not the wager content of the bet accepted at step S31 is the MAXBET. Specifically, the CPU 106 determines whether or not the accepted bet is of a three-credit wager, which is the maximum wager that can be betted on a single slot game. When the wager content of the accepted bet is the MAXBET (YES at step S51), the flow of control goes to the processing at step S52. When the wager content of the accepted bet is not the MAXBET (No at step S51), the rescue-setting-game determination processing is finished.

Figure 11A:
FIGS. 11A and 11B are examples of display on the screen of a Liquid Crystal Display (LCD) of the slot machine according to the embodiment of the invention.
Figure 11B:
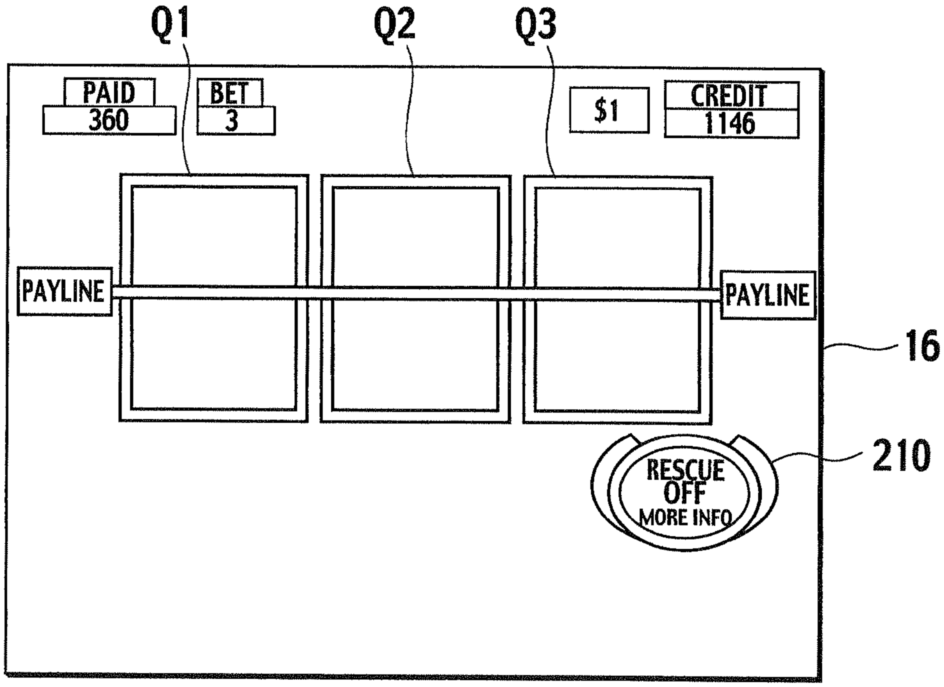
Figure 13A:
FIGS. 13A and 13B are examples of display on the screen of the LCD of the slot machine according to the embodiment of the invention.

At step S52, the CPU 106 switches what is displayed on each of the screens of the respective upper and the lower LCDs 33 and 16 from a display indicating that the current game is not a rescue-setting game to another display indicating that the current game is a rescue-setting game. Specifically, on the screen of the upper LCD 33, the CPU switches from a display of an image 200 with letters "RESCUE OFF" as shown in FIG. 11A to another display of an image 230 with letters "RESCUE ON" as shown in FIG. 13A. Also on the screen of the lower LCD 16, the CPU 106 switches a display of a selected image 210 with letters "RESCUE OFF" as shown in FIG. 11B to a display of the selected image 210 with letters "RESCUE ON" as shown in FIG. 13B.

When the player touches the selected image 210 on the screen of the lower LCD 16, the touch panel sensor 19 (see FIG. 3) detects the touching operation. Then, the CPU 106 causes the lower LCD 16 to display an image 220, as shown in FIG. 17, for a detailed description of the rescue pay. Specifically, displayed in this example are letters of "What is rescue pay? You have played a thousand slot games with MAXBET, but have never won a payout of sixty times or higher. Then, you get a 360-credit payout." The display of the explanatory image 220 is automatically terminated by the CPU 106 in a certain length of time.

Figure 12:
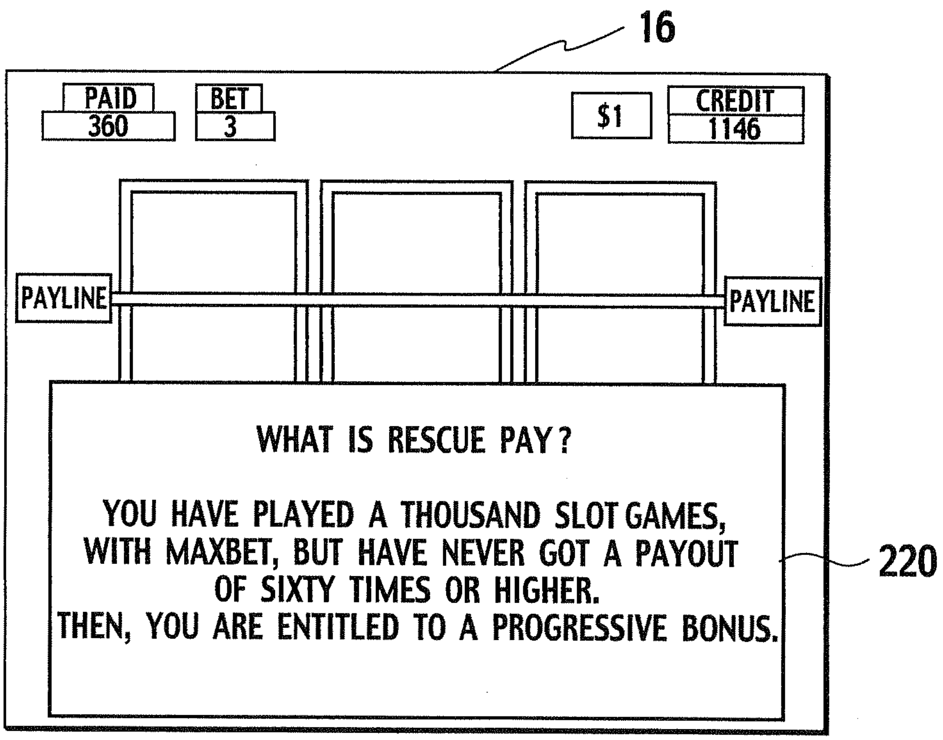
FIG. 12 is an example of display on the screen of the LCD of the slot machine according to the embodiment of the invention.
Figure 13B:
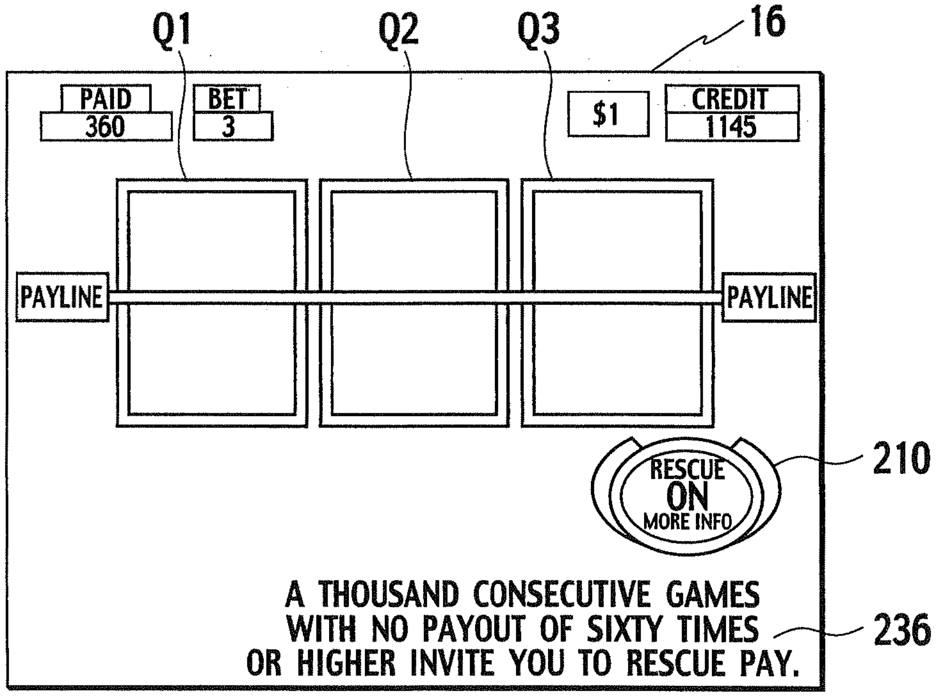

The number of payout credits of the rescue pay appears in the explanatory image 220 shown in FIG. 12, in the image 230 of FIG. 13A, and in the selected image 210 of FIG. 13B. This number is made to be the count value of the resources of the payout for the rescue pay, which count value is counted by the counter 128 and is updated to be the latest count value at step S35 in FIG. 4.

Subsequently at step S53 shown in FIG. 5, the CPU 106 sets the current slot game to be a rescue-setting game. Thereafter, the CPU 106 finishes the rescue-setting-game determination processing.

Figure 6:
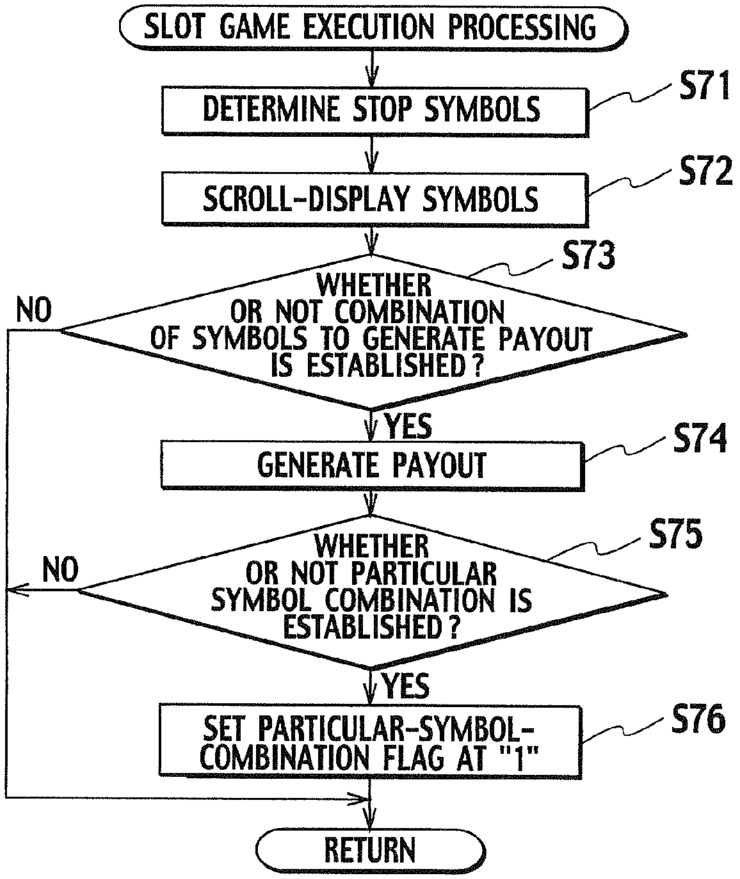
FIG. 6 is a flow chart showing a procedure for processing in the slot machine according to the embodiment of the present invention.

FIG. 6 is a flow chart showing the procedure for processing of the executing the slot game shown as step S34 in FIG. 4. A description will be given below of the slot-game execution processing with reference to FIG. 6.

Firstly, at step S71, the CPU 106 uses random numbers that the random number generating circuit 112 (see FIG. 3) generates, and determines the stop symbols for the respective display areas Q1 to Q3. Subsequently, at step S72, symbols are scroll-displayed in each of the display areas Q1 to Q3, and are stopped to be displayed in a predetermined length of time (for example, 5 seconds). The stop symbols that are displayed are the symbols determined at step S71. Thereafter, the flow of control goes to the processing at step S73.

At step S73, the CPU 106 determines whether or not the stop symbols in the display areas Q1 to Q3 form a winning combination, which generates a payout. A payout table shown in FIG. 10 defines winning combinations. Specifically, when each of the three display areas Q1 to Q3 has a symbol of "DOUBLE," an 800-credit payout occurs for a bet of one credit. When each of the three display areas Q1 to Q3 has a symbol of "Triple BAR," a 60-credit payout occurs for a bet of one credit. For a case where each of the three display areas Q1 to Q3 has a symbol of "Double BAR," another case where each of the three display areas Q1 to Q3 has a symbol of "CHERRY," and still another case where each of the three display areas Q1 to Q3 has a symbol of "Single BAR," the amounts of the corresponding payouts are set. Payouts are set likewise for a case where each of the three display areas Q1 to Q3 has any one of the above-mentioned symbols of "Triple BAR," "Double BAR" and "Single BAR" (ANYBAR), for a case two of the three display areas Q1 to Q3 have symbols of "CHERRY" and for a case one of the three display areas Q1 to Q3 has a symbol of "CHERRY."

At step S74, the CPU 106 executes a processing for generating a payout that corresponds to the above-described winning combinations. At step S75, the CPU 106 determines whether or not the stop symbols in three display areas Q1 to Q3 form a particular symbol combination. In this embodiment, a winning combination for which a payout of 60 credits or higher occurs is defined as a particular symbol combination. Accordingly, when the three display areas have three symbols of "DOUBLE" or three symbols of "Triple BAR," as shown in FIG. 10, it is determined that a particular symbol combination is established.

Then, at step S76, when it is determined that one of the above-mentioned particular symbol combinations is formed, the CPU 106 sets a particular-symbol-combination flag at "1." Thereafter, the slot-game execution processing is finished.

Briefly, in the slot-game execution processing shown in FIG. 6, when a winning combination is established, a payout corresponding to the winning combination is generated, at the same time, when a particular symbol combination, which gives a higher return to the player (in this embodiment, three symbols of "DOUBLE" or those of "Triple BAR"), a payout corresponding to the particular symbol combination is generated, and, additionally, the particular-symbol-combination flag is set at "1."

Figure 7:
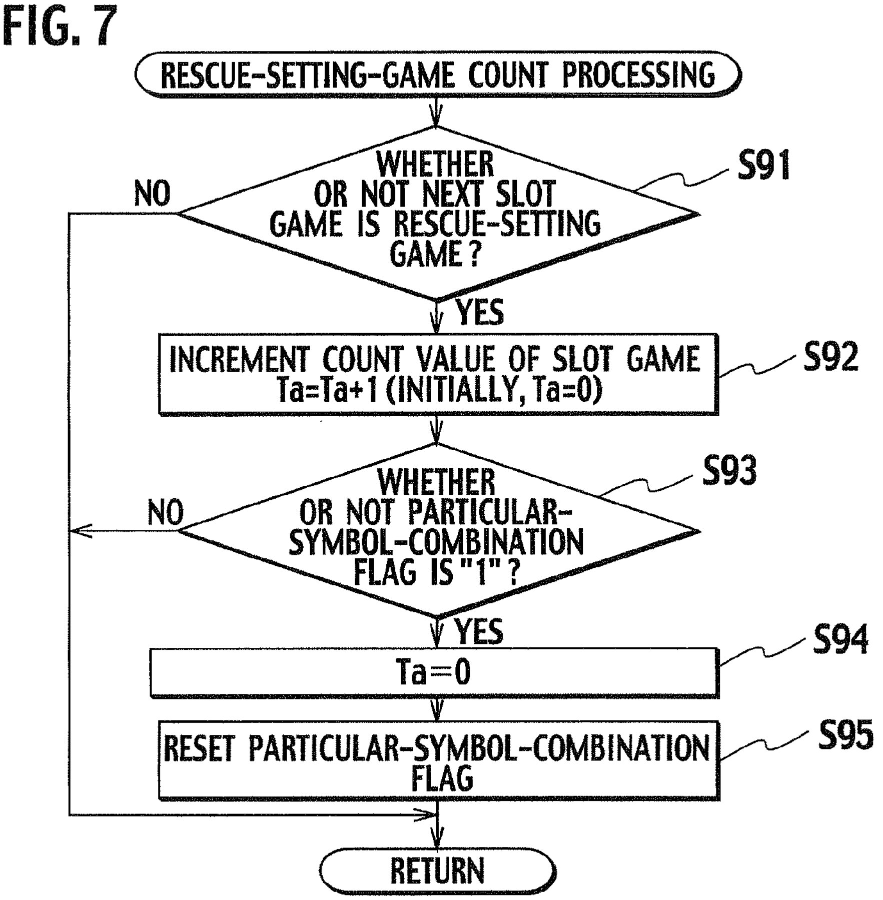
FIG. 7 is a flow chart showing a procedure for processing in the slot machine according to the embodiment of the present invention.

Subsequently, with reference to a flowchart shown in FIG. 7, a description will be given of a processing for counting rescue-setting games shown as step S36 in FIG. 4.

Firstly, at step S91, the CPU 106 determines whether or not the next slot game to be executed is a rescue-setting game. When it is determined that the next game is not a rescue-setting game (No at step S91) in this determination processing, the rescue-setting-game count processing is finished. When, on the other hand, it is determined that the next game is a rescue-setting game (YES at step S91), the flow of control goes to the processing at step S92.

At step S92, the CPU 106 increments the count value Ta for slot games as rescue-setting games. To put it simply, the count value Ta=Ta+1. Here, the count value Ta is initially (when the slot machine 10 is turned ON) is set at zero, and is reset in the processing at step S95, which will be described later. Note that the count value Ta, here, is a value obtained by counting how many rescue-setting games have been executed. When the processing is finished, the flow of control goes to the processing at step S93.

At step S93, the CPU 106 determines whether or not the particular-symbol-combination flag is "1". In other words, the CPU 106 determines whether or not the particular-symbol-combination flag described at step S76 in FIG. 6 is "1." When it is determined that the particular-symbol-combination flag is "1" (YES at step S93), the CPU 106 resets the count value Ta in the processing at step S94, and resets also the particular-symbol-combination flag in the processing at step S95.

Alternatively, when it is determined that the particular-symbol-combination flag is not "1" in the determination processing at step S93, the processing of counting the rescue-setting games is finished. In other words, when the particular-symbol-combination flag is not "1," the current slot game moves on to the next slot game while the count value Ta is kept at the incremented value. Thereafter, the processing is finished.

In the above-described processing of counting the rescue setting games, the counting of the consecutive slot games with MAXBET in each of which no particular symbol combination is established is carried out in the following way. Suppose a case where the wager betted on the current slot game is MAXBET. When no winning combination that generates a payout of 60 credits or higher for a wager of 1 credit (where no particular symbol combination is established) occurs, the count value Ta is incremented. Meanwhile, when one of the winning combinations generating a payout of 60 credits or higher for a wager of 1 credit (where a particular symbol combination is established) occurs, the count value Ta is reset.

Subsequently, with reference to a flowchart shown in FIG. 8, a description will be given of the procedure of a processing for executing a rescue pay shown as step S37 in FIG. 4. Firstly, at step S101, the CPU 106 determines whether or not the current slot game is a rescue-setting game. In other words, the CPU 106 determines whether or not the current game is a slot game that is set to be a rescue-setting game in the processing at step S53 in FIG. 5. Then, when the current game is a rescue-setting game, the flow of control goes to step S102. When, on the other hand, the current game is not a rescue-setting game, the rescue-pay execution processing is finished.

At step S102, the CPU 106 determines whether or not the count value Ta for the slot games as rescue-setting games is an maximum value $Ta_{max}$ (for example, $Ta_{max}$=1000) that is set in advance (a predetermined value). When Ta=$Ta_{max}$, the flow of control goes to processing at step S103. When, on the other hand, Ta≠$Ta_{max}$, the rescue-pay execution processing is finished.

At step S103, the CPU 106 resets the count value Ta for the slot games as rescue-setting games, and, additionally, executes a processing for generating a payout for rescue pay. Specifically, when no particular symbol combination is established over a maximum number $Ta_{max}$ of consecutive rescue setting games, or to be more precise, when no winning combination with a payout of 60 credits or higher for a bet of one credit occurs over the above-mentioned number of rescue-setting games, a payout for rescue pay occurs.

Figure 14A:
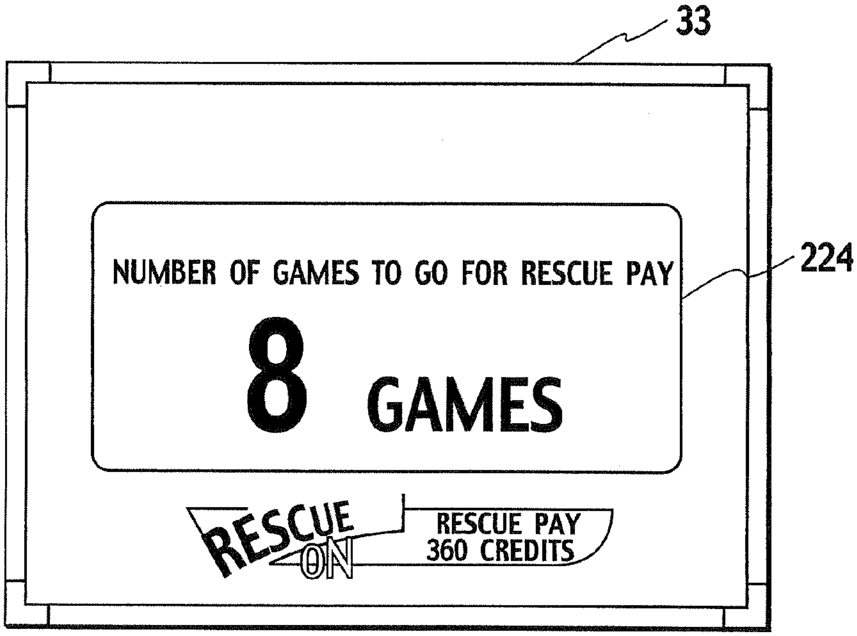
FIGS. 14A and 14B are examples of display on the screen of the LCD of the slot machine according to the embodiment of the invention.
Figure 14B:
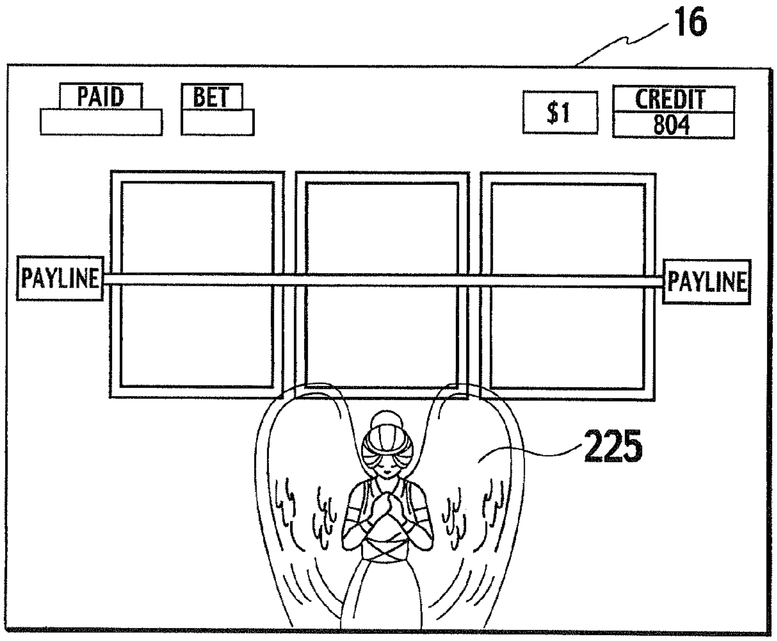

FIGS. 14A and 14B are examples of images displayed respectively on the screens of the upper and the lower LCDs 33 and 16 when the count value Ta approaches the maximum value $Ta_{max}$. When the count value Ta is "992," an image 224, which notifies the player that 8 games remain before a rescue pay occurs, is displayed on the screen of the upper LCD 33. Meanwhile, an image 225 of an angel with her wings folded is displayed on the screen of the lower LCD 16.

Figure 15A:
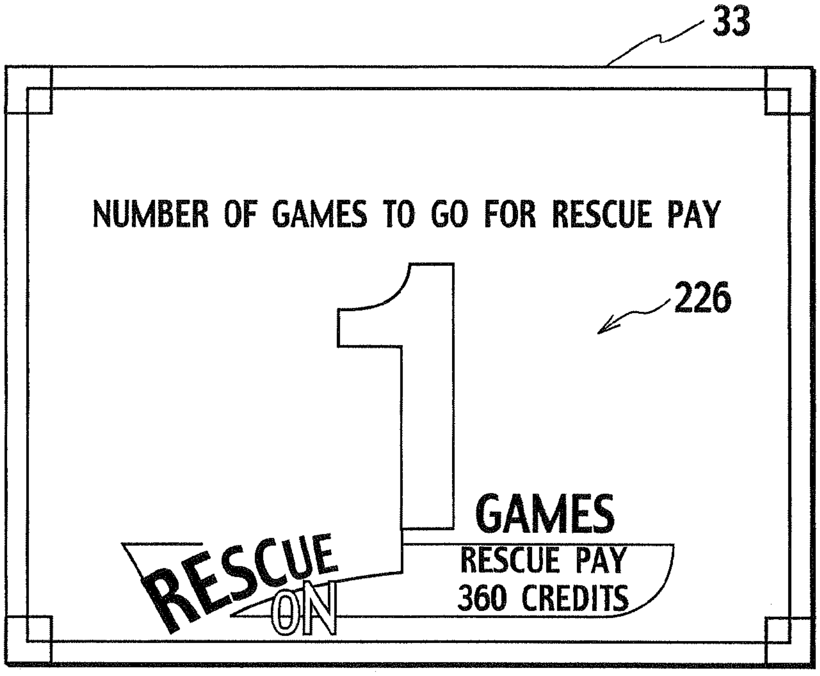
FIGS. 15A and 15B are examples of display on the screen of the LCD of the slot machine according to the embodiment of the invention.
Figure 15B:
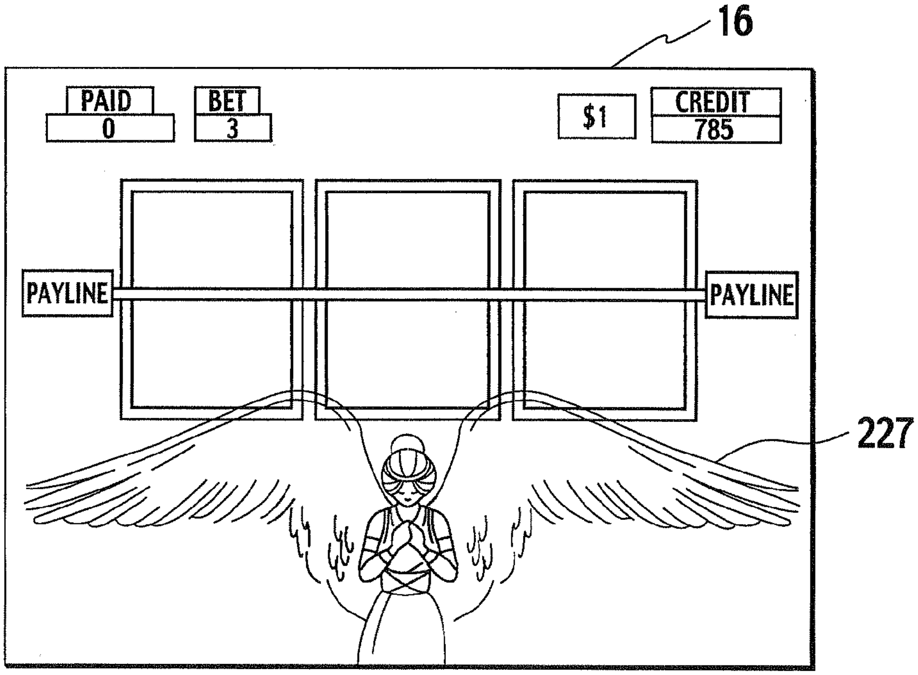

FIGS. 15A and 15B are examples of images displayed respectively on the screens of the upper and the lower LCDs 33 and 16 when the count value Ta is "999." An image 226, which notifies the player that 1 game remains before a rescue pay occurs, is displayed on the screen of the upper LCD 33. Meanwhile, an image 227 of an angel with her wings unfolded is displayed on the screen of the lower LCD 16.

Figure 16A:
FIGS. 16A and 16B are examples of display on the screen of the LCD of the slot machine according to the embodiment of the invention.
Figure 16B:
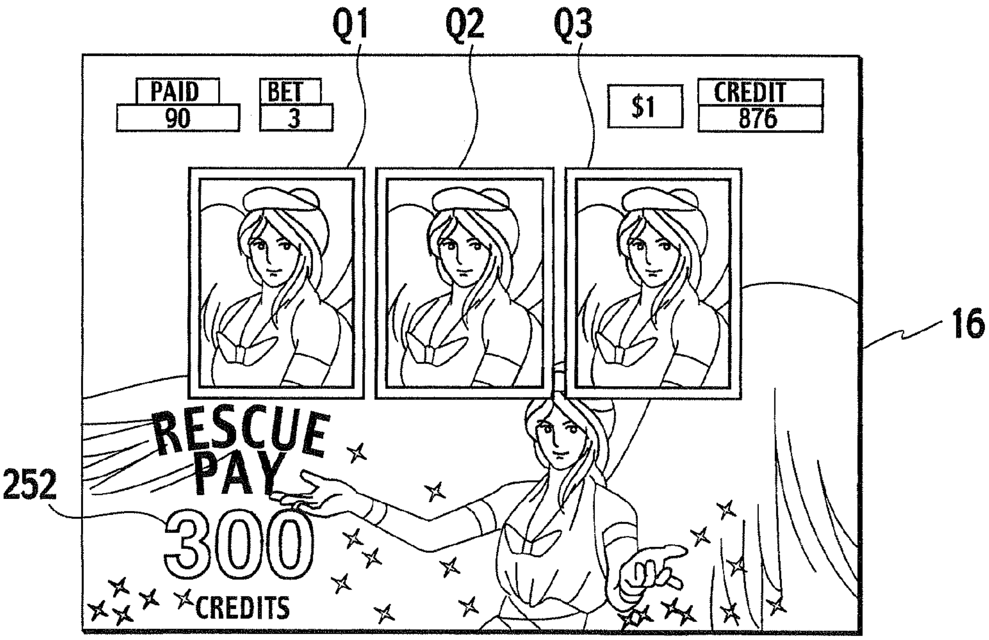

FIGS. 16A and 16B are examples of images displayed respectively on the screens of the upper and the lower LCDs 33 and 16 when the count value Ta reaches its maximum value $Ta_{max}$, that is, "1000." Images 316 and 252 are respectively displayed on the screens of the upper and the lower LCDs 33 and 16. The images 316 and 252 indicate that a payout of 360 credits, which are counted by the counter 128 as a resource for the payout for rescue pay, is generated as a payout for rescue pay.

The number of the payout credits of the rescue pay appears in the image 224 of FIG. 14A, in the image 226 of FIG. 15A, in the image 316 of FIG. 16A, and in the image 252 of FIG. 16B. This number, like the number of the payout credits of the rescue pay appearing in the explanatory image 220 shown in FIG. 12, in the image 230 of FIG. 13A, and in the image 210 of FIG. 13B, is made to be the count value of the resources of the payout for the rescue pay, which count value is counted by the counter 128 and is updated to be the latest count value at step S35 in FIG. 4.

Figure 9:
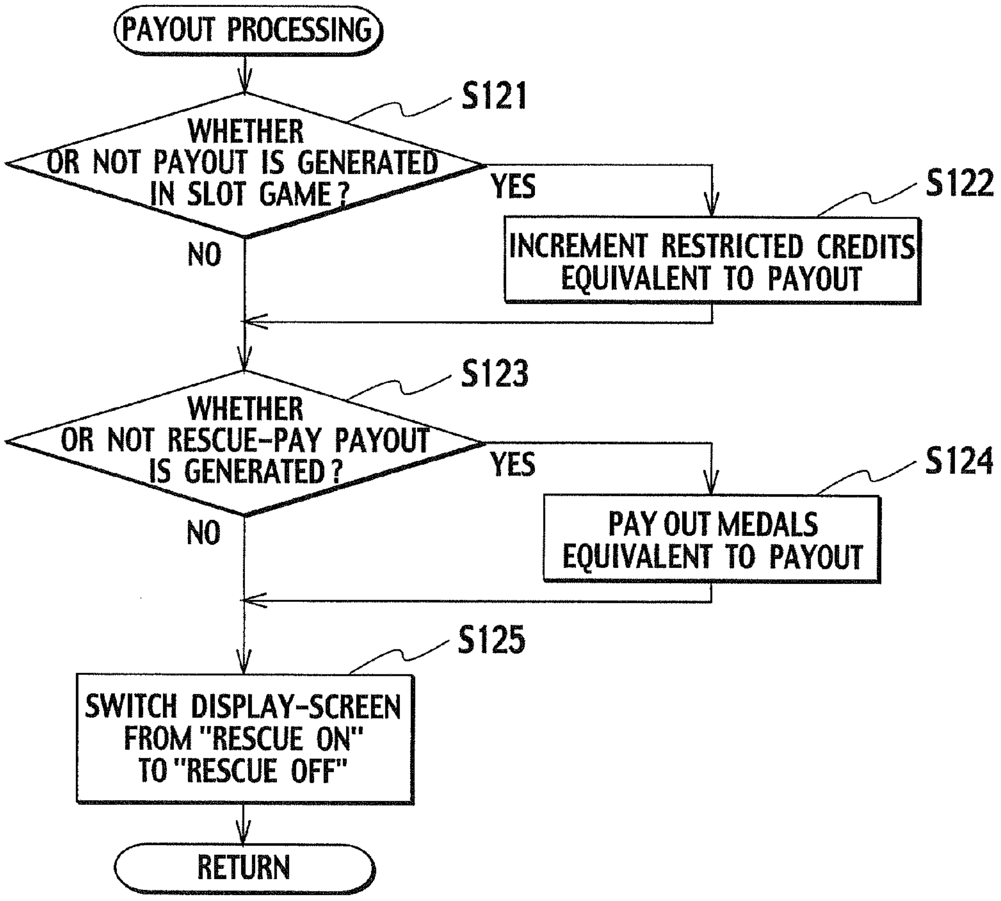
FIG. 9 is a flow chart showing a procedure for processing in the slot machine according to the embodiment of the present invention.

Subsequently, with reference to a flowchart shown in FIG. 9, a description will be given of a payout processing shown as step S38 in FIG. 4. Firstly, at step S121, the CPU 106 determines whether or not a payout is generated in a slot game, that is, whether or not a winning combination is displayed in a slot game. Specifically, the CPU 106 determines whether or not a payout is generated in the processing at step S74 in FIG. 6. When a payout is generated in the slot game (YES at step S121), the CPU 106 increments, by the amount equivalent to the generated payout, the stored number of the restricted credits displayed on the screen of the lower LCD 16 (step S122). Thereafter, the flow of control goes to the proceeding at step S123. When, on the other hand, no payout is generated in the slot game (NO at step S121), the CPU 106 causes the flow of control to go to the processing at step S123.

Figure 8:
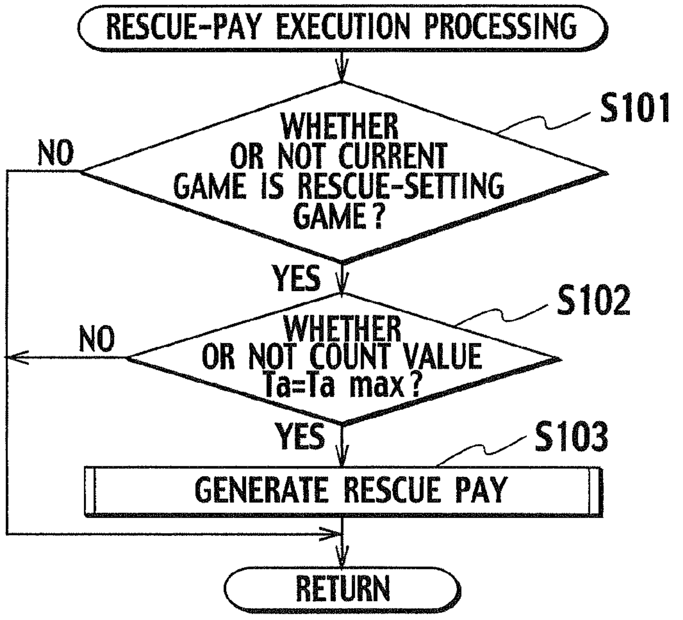
FIG. 8 is a flow chart showing a procedure for processing in the slot machine according to the embodiment of the present invention.

At step S123, the CPU 106 determines whether or not a payout for the rescue pay is generated at step S103 in FIG. 8, that is, whether or not the maximum number $Ta_{max}$ of rescue-setting games in each of which no particular symbol combination is established have been executed consecutively. When a payout for the rescue pay is generated (YES at step S123), the CPU 106 drives the hopper driving circuit, and pays out, from the hopper 44 to the medal tray 18, medals equivalent to the current number of credits that the counter 128 counts as the resource of the payout for the rescue pay (step S124). Here, the current number of credits that the counter 128 counts as the resource of the payout for the rescue pay is the latest count value counted by the counter 128, as being updated at step S35 in FIG. 4, of the resource of the payout for the rescue pay. After step S123, the CPU 106 causes the flow of control to go to the processing at step S125.

At step S125, the CPU 106 switches the displays on the screens of the upper and the lower LCDs 33 and 16 from displays indicating that the current game is a rescue-setting game to displays indicating that the current game is not a rescue-setting game. Specifically, the CPU 106 switches the display on the screen of the upper LCD 33 from a display of the image 230 with the letters "RESCUE ON" shown in FIG. 13A to another display of the image 200 with the letters "RESCUE OFF" shown in FIG. 11A. The CPU 106 also switches the display on the screen of the lower LCD 16 from a display of the letters of "RESCUE ON" appearing in the selected image 210 as shown in FIG. 13B to another display of the letters of "RESCUE OFF" appearing in the selected image 210 as shown in FIG. 11B. Thereafter the payout processing is finished.

As described above, in the slot machine 10 according to this embodiment, when the count value reaches its maximum value $Ta_{max}$ (a predetermined value) in a rescue-setting game, a payout for a rescue pay is provided.

In the slot machine 10 according to this embodiment, when the player makes, on a slot game, a bet of three-credit wager, which is the maximum wager on a single slot game, that is, when the player makes a MAXBET on a slot game, the slot game is set to be a rescue-setting game.

Moreover, according to the slot game 10 of this embodiment, the payout for the rescue pay increases by an amount equivalent to a part of a wager betted on a slot game.

In this embodiment, when a payout is generated in a slot game, the stored number of restricted credits displayed on the screen of the lower LCD 16 is incremented. Meanwhile, when a rescue pay is generated, the wagers to be paid out are converted into coins or medals, and then are paid out from the medal-paying-out opening 28.

As a result, the generation of a payout by rescue pay is more appealing to the player and the gallery around the player than the generation of a payout in a slot game.

Note, however, that the payout generated in a slot game can be performed either by incrementing the stored number of restricted credits displayed on the screen of the lower LCD 16 or by paying out the coins or medals from the medal-paying-out opening 28, and so can the payout generated as rescue pay. Accordingly, the way of providing the payout for the slot game and the way providing the payout for the rescue pay can be switched arbitrarily.

Subsequently, a description will be given of a modified example of the embodiment described above. The modified example is different from the embodiment described above only in the processing of updating the payout for the rescue pay, which payout is counted by the counter 128, shown as step S35 in FIG. 4.

In the rescue-pay payout updating processing shown as step S35 in FIG. 4, the slot machine 10 according to the modified example executes a processing of incrementing the count value of the counter 128 for counting the resource for the rescue pay. The increment processing is executed every time the CPU 106 determines that the content of the betting of the wager accepted at step S31 is a MAXBET, in other words, every time the CPU 106 determines that what is accepted is a three-credit wager, that is, the maximum wager that can be betted on a single slot game. The increment amount here is equivalent to a part of the maximum wager (for example, one credit).

As described above, in the modified example, when a betting of a 3-credit wager, the maximum wager that can be betted on a single slot game, is made on a slot game, that is, when a MAXBET is made on a slot game, the payout for the rescue pay is increased by an amount equivalent to a part of the wager betted as MAXBET.

Subsequently, a description will be given of a second modified example of the embodiment described above. The second modified example is different from the above-described embodiment also only in the processing of updating the payout for the rescue pay, which payout is counted by the counter 128, shown as step S35 in FIG. 4.

In the rescue-pay payout updating processing according to the second modified example, every time a payout for an executed slot game occurs in the processing at step S74 in FIG. 6, the CPU 106 executes a processing of incrementing the count value of the counter 128 for counting the resource of the payout for the rescue pay by an amount equivalent to a part of the payout (for example, 10% of the payout).

As described above, in this second modified example, when a payout occurs in a slot game, the payout for the rescue pay is increased by an amount equivalent to a part of the payout occurs in the slot game.

In the above-described embodiment of the present invention and also in the above-described modified examples of the embodiment, in exchange for increasing the payout for the rescue pay by an amount equivalent to a part of the wager that the player bets on a slot game (including a case where only a wager of MAXBET is subject to the rule), the slot game may be executed with a wager decreased by an amount equivalent to the above-mentioned part of the wager. Likewise, in the above-described embodiment and also in the above-described modified examples, in exchange for increasing the payout for the rescue pay by an amount equivalent to a part of the payout that occurs in a slot game, a payout of resultant amount which is obtained by subtracting the above-mentioned part of the payout from the payout that occurs in the slot game may be provided.

The gaming machine of the present invention and the method of playing the gaming machine have been described thus far using the illustrated embodiment. The present invention, however, is not limited to this. The configuration of each part can be replaced by any configuration with similar functions.

For example, in the example of the above-described embodiment, three display areas Q1 to Q3 are provided to the lower LCD 16, and slot games are executed with these display areas Q1 to Q3. The present invention, however, is not limited to this, and is applicable to a case with various types of display area arrangements, such as those of three rows and of five columns.

In the above-described configuration, the player arbitrarily chooses an option by touching the touch panel sensor 19. The arbitrary choice, however, may be made by operation on switches without using the touch panel sensor 19.

In the slot machine 10 described in this embodiment, slot games are executed by displaying images of symbols on the screen of the lower LCD 16. The present invention, however, is not limited to this. A possible configuration may have drums each of which has a circumferential surface with a plurality of symbols printed thereon, and slot games are performed by rotating the drums.

In this embodiment, the slot machine 10 is described as an example of a gaming machine, but the present invention is not limited to this. The present invention is applicable to other gaming machines such as one performing a horse racing game.

For an easy understanding of the present invention, the detailed description thus far has been given by focusing on characteristic portions. The present invention is not limited to the embodiment described in the above detailed description, and is applicable to other embodiments. Various applications are conceivable. The terms and wordings used in this specification are used for explaining the present invention accurately. They are not used for limiting the interpretation of the present invention. A person skilled in the art may conceive other configurations, other systems and other methods included in the scope of the present invention on the basis of the concept of the invention described in this specification. Accordingly, the description in the scope of claims has to be read as including any equivalent configuration without departing from the scope of the technical idea of the present invention. An object of the abstract is to make a person skilled in the art judge technical contents of this application and its essence quickly, with a simple examination even for a person not familiar with the Patent Office and general public institutions, and with terminologies of patent, of law and of the art. Accordingly, the abstract is not provided to limit the scope of the invention, which should be assessed by the description in the scope of claims. To understand better objectives and advantageous effects peculiar to the present invention, documents that have already been disclosed and the like are preferably consulted sufficiently.

The detailed description that has been given above includes a processing executed by a computer. The description and the expression used in the detailed description have an object, specifically, to facilitate an efficient understanding of the person skilled in the art. In this specification, the steps used to obtain a result should be understood as self-consistent processing. In the steps, electrical, or magnetic, signals are transmitted, received, and stored. The signal is expressed, in the processing at each step, by bit, value, symbol, letter, terms, numbers and the like. It should be, however, noted that these are employed only for the explanatory convenience. The processing at each step is sometimes described with an expression that is also used to describe an activity of a human being. Nevertheless, the processing described in this specification is basically executed by various devices. In addition, other configuration necessary for the execution of each step becomes self-evident from the description given above.

What is claimed is:

1. A gaming machine comprising:

a bet switch capable of betting in a plurality of patterns with different amount of wagers;

a display adapted to display a game operable upon a wager made by a player;

a first counter in which a count value of the first counter is incremented by an execution of the game on which a player bets a maximum wager and the count value of the first counter is reset when a first reset condition is established;

a second counter in which a count value of the second counter is incremented by an occurrence of an award in the game and the count value of the second counter is reset when a second reset condition is established; and a controller configured to:

(a) provide an award for insurance having an amount based on the count value of the second counter when the count value of the first counter reaches a predetermined value;

(b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

2. The gaming machine according to claim 1, further comprising:

a credit display adapted to display a number of remaining restricted credits, the restricted credit being stored in the gaming machine and continuing to be usable as a wager until the restricted credit is converted into cash; and a tray to which cashable credits are provided, the cashable credit being usable as a wager by being thrown into the gaming machine, wherein the controller is configured to discriminate between the cashable credit and the restricted credit;

provide an award corresponding to an outcome of the game by an increment of the number displayed on the credit display; and provide the award for insurance by providing the cashable credit to the tray.

3. A gaming machine comprising:

a bet switch capable of betting in a plurality of patterns with different amount of wagers;

a display adapted to display a game operable upon a wager made by a player;

a first counter in which a count value of the first counter is incremented by an execution of the game on which a player bets a maximum wager and the count value of the first counter is reset when a first reset condition is established;

a second counter in which a count value of the second counter is incremented, for every execution of the game by an occurrence of an award in the game, by an amount equivalent to a part of the maximum wager betted on the executed game and the count value of the second counter is reset when a second reset condition is established; and a controller configured to:

(a) provide an award for insurance having an amount based on the count value of the second counter when the count value of the first counter reaches a predetermined value;

(b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

4. The gaming machine according to claim 3, further comprising:

a credit display adapted to display a number of remaining restricted credits, the restricted credit being stored in the gaming machine and continuing to be usable as a wager until the restricted credit is converted into cash; and a tray to which cashable credits are provided, the cashable credit being usable as a wager by being thrown into the gaming machine, wherein the controller is configured to discriminate between the cashable credit and the restricted credit;

provide an award corresponding to an outcome of the game by an increment of the number displayed on the credit display; and provide the award for insurance by providing the cashable credit to the tray.

5. A gaming machine comprising:

a bet switch capable of betting in a plurality of patterns with different amount of wagers;

a display adapted to display a game operable upon a wager made by a player;

a first counter in which a count value of the first counter is incremented by an execution of the game on which a player bets a maximum wager and by an occurrence of an award in the game and the count value of the first counter is reset when a first reset condition is established;

a second counter in which a count value of the second counter is incremented, for every execution of the game on which the player bets the maximum wager, by an amount equivalent to a part of the maximum wager betted on the executed game and the count value of the second counter is reset when a second reset condition is established; and a controller configured to:

(a) provide an award for insurance having an amount based on the count value of the second counter when the count value of the first counter reaches a predetermined value;

(b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

6. The gaming machine according to claim 5, further comprising:

a credit display adapted to display a number of remaining restricted credits, the restricted credit being stored in the gaming machine and continuing to be usable as a wager until the restricted credit is converted into cash; and a tray to which cashable credits are provided, the cashable credit being usable as a wager by being thrown into the gaming machine, wherein the controller is configured to discriminate between the cashable credit and the restricted credit;

provide an award corresponding to an outcome of the game by an increment of the number displayed on the credit display; and provide the award for insurance by providing the cashable credit to the tray.

7. A gaming machine comprising:

a bet switch capable of betting in a plurality of patterns with different amount of wagers;

a display adapted to display a game operable upon a wager made by a player;

a first counter in which a count value of the first counter is incremented by an execution of the game on which a player bets a maximum wager and the count value of the first counter is reset when a first reset condition is established;

a second counter in which a count value of the second counter is incremented, for every occurrence of an award corresponding to an outcome of the game, by an amount equivalent to a part of the occurred award and the count value of the second counter is reset when a second reset condition is established; and a controller configured to:

(a) provide an award for insurance having an amount based on the count value of the second counter when the count value of the first counter reaches a predetermined value;

(b) reset the count value of the first counter when the award for insurance is provided, the provision of the award for insurance being identified with the establishment of the first reset condition; and (c) reset the count value of the second counter when the award for insurance is provided, the provision of the award for insurance being identified with the establishment of the second reset condition.

8. The gaming machine according to claim 7, further comprising:

a credit display adapted to display a number of remaining restricted credits, the restricted credit being stored in the gaming machine and continuing to be usable as a wager until the restricted credit is converted into cash; and a tray to which cashable credits are provided, the cashable credit being usable as a wager by being thrown into the gaming machine, wherein the controller is configured to discriminate between the cashable credit and the restricted credit;

provide an award corresponding to an outcome of the game by an increment of the number displayed on the credit display; and provide the award for insurance by providing the cashable credit to the tray.

9. A method of controlling a gaming machine having a processor, the method comprising the steps of:

accepting, via the processor, a betting of a wager made by a player;

executing, via the processor, a game in response to the betting of the wager made by the player;

incrementing, via the processor, a count value of a first counter with the execution of the game on which the player bets a maximum wager;

incrementing, via the processor, a count value of a second counter with an occurrence of an award in the game;

providing, via the processor, an award for insurance having an amount based on the count value of the second counter when the count value of the first counter reaches a predetermined value;

resetting, via the processor, the count value of the first counter when the award for insurance is provided; and resetting, via the processor, the count value of the second counter when the award for insurance is provided.

10. The method of controlling a gaming machine according to claim 9, further comprising the steps of:

displaying, via the processor, a number of remaining restricted credits on a credit display, the restricted credit being stored in the gaming machine and continuing to be usable as a wager until the restricted credit is converted into cash; and providing, via the processor, an award corresponding to an outcome of the game by an increment of the number displayed on the credit display, wherein the step of providing an award for insurance is executed by providing cashable credits to a tray, the cashable credit being usable as a wager by being thrown into the gaming machine.

11. A method of controlling a gaming machine having a processor, the method comprising the steps of:

accepting, via the processor, a betting of a wager made by a player;

executing, via the processor, a game in response to the betting of the wager made by the player;

incrementing, via the processor, a count value of a first counter with the execution of the game on which the player bets a maximum wager;

incrementing, via the processor, a count value of a second counter, for every execution of the game by an occurrence of an award in the game, by an amount equivalent to a part of the maximum wager betted on the executed game;

providing, via the processor, an award for insurance having an amount based on the count value of the second counter when the count value of the first counter reaches a predetermined value;

resetting, via the processor, the count value of the first counter when the award for insurance is provided; and resetting, via the processor, the count value of the second counter when the award for insurance is provided.

12. The method of controlling a gaming machine according to claim 11, further comprising the steps of:

displaying, via the processor, a number of remaining restricted credits on a credit display, the restricted credit being stored in the gaming machine and continuing to be usable as a wager until the restricted credit is converted into cash; and providing, via the processor, an award corresponding to an outcome of the game by an increment of the number displayed on the credit display, wherein the step of providing an award for insurance is executed by providing cashable credits to a tray, the cashable credit being usable as a wager by being thrown into the gaming machine.

13. A method of controlling a gaming machine having a processor, the method comprising the steps of:

accepting, via the processor, a betting of a wager made by a player;

executing, via the processor, a game in response to the betting of the wager made by the player;

incrementing, via the processor, a count value of a first counter with the execution of the game on which the player bets a maximum wager;

incrementing, via the processor, a count value of a second counter, for every execution of the game on which the player bets the maximum wager and by an occurrence of an award in the game, by an amount equivalent to a part of the maximum wager;

providing, via the processor, an award for insurance having an amount based on the count value of the second counter when the count value of the first counter reaches a predetermined value;

resetting, via the processor, the count value of the first counter when the award for insurance is provided; and resetting, via the processor, the count value of the second counter when the award for insurance is provided.

14. The method of controlling a gaming machine according to claim 13, further comprising the steps of:

displaying, via the processor, a number of remaining restricted credits on a credit display, the restricted credit being stored in the gaming machine and continuing to be usable as a wager until the restricted credit is converted into cash; and providing, via the processor, an award corresponding to an outcome of the game by an increment of the number displayed on the credit display, wherein the step of providing an award for insurance is executed by providing cashable credits to a tray, the cashable credit being usable as a wager by being thrown into the gaming machine.

15. A method of controlling a gaming machine having a processor, the method comprising the steps of:

accepting, via the processor, a betting of a wager made by a player;

executing, via the processor, a game in response to the betting of the wager made by the player;

incrementing, via the processor, a count value of a first counter with the execution of the game on which the player bets a maximum wager;

incrementing, via the processor, a count value of a second counter, for every occurrence of an award corresponding to an outcome of the game, by an amount equivalent to a part of the occurred award;

providing, via the processor, an award for insurance having an amount based on the count value of the second counter when the count value of the first counter reaches a predetermined value;

resetting, via the processor, the count value of the first counter when the award for insurance is provided; and resetting, via the processor, the count value of the second counter when the award for insurance is provided.

16. The method of controlling a gaming machine according to claim 15, further comprising the steps of:

displaying, via the processor, a number of remaining restricted credits on a credit display, the restricted credit being stored in the gaming machine and continuing to be usable as a wager until the restricted credit is converted into cash; and providing, via the processor, an award corresponding to the outcome of the game by an increment of the number displayed on the credit display, wherein the step of providing an award for insurance is executed by providing cashable credits to a tray, the cashable credit being usable as a wager by being thrown into the gaming machine.

* * * * *